US010959894B2

(12) United States Patent
Furman et al.

(10) Patent No.: US 10,959,894 B2
(45) Date of Patent: Mar. 30, 2021

(54) PATIENT SUPPORT APPARATUS WITH ACTUATOR FEEDBACK

(71) Applicant: Stryker Corporation, Kalamazoo, MI (US)

(72) Inventors: Aaron Douglas Furman, Kalamazoo, MI (US); Anish Paul, Portage, MI (US); Daniel Vincent Brosnan, Kalamazoo, MI (US); Christopher S. Hough, Kalamazoo, MI (US); Janani Gopalkrishnan, Portage, MI (US)

(73) Assignee: Stryker Corporation, Kalamazoo, MI (US)

( * ) Notice: Subject to any disclaimer, the term of this patent is extended or adjusted under 35 U.S.C. 154(b) by 398 days.

(21) Appl. No.: 15/449,277

(22) Filed: Mar. 3, 2017

(65) Prior Publication Data

US 2017/0252241 A1    Sep. 7, 2017

Related U.S. Application Data

(60) Provisional application No. 62/303,103, filed on Mar. 3, 2016.

(51) Int. Cl.
*A61G 7/018*    (2006.01)
*A61G 5/10*    (2006.01)
(Continued)

(52) U.S. Cl.
CPC ........... *A61G 7/018* (2013.01); *A61G 5/1056* (2013.01); *A61G 5/1075* (2013.01);
(Continued)

(58) Field of Classification Search
CPC ... F16H 25/2015; A61G 7/018; A61G 5/1056; A61G 5/1075; A61G 5/1059; A61G 5/04;
(Continued)

(56) References Cited

U.S. PATENT DOCUMENTS 3,222,693 A * 12/1965 Pruim .................. A47C 19/045
                                                          5/618
5,064,044 A    11/1991 Oketani et al.
(Continued)

FOREIGN PATENT DOCUMENTS

WO        2009/146738 A1    12/2009

OTHER PUBLICATIONS

Product Data Sheet Techline Actuator LA14, Linak.

*Primary Examiner* — Nicholas F Polito
*Assistant Examiner* — Morgan J McClure
(74) *Attorney, Agent, or Firm* — Warner Norcross + Judd LLP

(57) ABSTRACT

A patient support apparatus—such as a bed, chair, cot, stretcher, or the like—includes a frame, support surface, movable component, an actuator, and a controller. The actuator includes a motor, an encoder, a spindle, an extendable arm, multiple power switches, and a position switch. The controller estimates a position of the extendable arm based on motor encoder signals and updates the position estimate when the arm triggers the position switch. The power switches cut power to the motor without intervention by the controller when the extendable arm triggers either of the power switches. In some embodiments, the motor is a brushless DC motor. In still other embodiments, multiple position switches are adapted to be open in different ranges of position, and the controller determines which range the extendable arm is located in based on the state of the position switches.

16 Claims, 10 Drawing Sheets

(51) Int. Cl.
*A47C 20/04* (2006.01)
*F16H 25/20* (2006.01)

(52) U.S. Cl.
CPC .......... *A47C 20/041* (2013.01); *A61G 5/1059* (2013.01); *A61G 2203/30* (2013.01); *F16H 25/2015* (2013.01)

(58) Field of Classification Search
CPC .............. A61G 2203/30; A47C 1/0242; A47C 1/03211; A47C 20/041
See application file for complete search history.

(56) References Cited

U.S. PATENT DOCUMENTS

| | | | | |
|---|---|---|---|---|
| 6,191,545 | B1* | 2/2001 | Kawabata | H02P 6/18 318/400.01 |
| 6,727,667 | B2* | 4/2004 | Cheng | G05D 3/125 200/5 B |
| 7,703,158 | B2 | 4/2010 | Wilker, Jr. et al. | |
| 7,932,473 | B2* | 4/2011 | Sorensen | A61G 7/018 200/61.41 |
| 8,040,082 | B2* | 10/2011 | Bastholm | F16H 25/2015 318/135 |
| 8,358,096 | B2* | 1/2013 | Bastholm | F16H 25/2015 192/138 |
| 8,378,610 | B2* | 2/2013 | Jensen | F16H 25/2015 318/468 |
| 8,508,168 | B2* | 8/2013 | Duits | F16H 25/2015 318/468 |
| 2005/0210579 | A1* | 9/2005 | Moffa | A61G 7/1017 5/81.1 R |
| 2008/0289108 | A1* | 11/2008 | Menkedick | A61G 7/0528 5/610 |
| 2012/0174314 | A1* | 7/2012 | Clement | A61G 7/10 5/81.1 R |
| 2012/0193946 | A1* | 8/2012 | Robertson | A47C 1/03294 297/68 |
| 2012/0319626 | A1* | 12/2012 | Wichert | H02P 6/00 318/139 |
| 2014/0215717 | A1* | 8/2014 | Rigsby | A61G 7/002 5/613 |
| 2014/0250597 | A1* | 9/2014 | Chen | A61G 7/018 5/600 |
| 2015/0164722 | A1* | 6/2015 | Roussy | A61G 7/0507 5/430 |
| 2016/0081865 | A1* | 3/2016 | Brosnan | A61G 7/018 700/275 |
| 2016/0095773 | A1* | 4/2016 | Ruch | A61G 7/018 5/616 |
| 2016/0184155 | A1* | 6/2016 | Streeter | A61G 7/05769 700/282 |
| 2016/0193095 | A1* | 7/2016 | Roussy | A61G 7/002 5/11 |

* cited by examiner

PATENT SUPPORT APPARATUS WITH ACTUATOR FEEDBACK

CROSS-REFERENCE TO RELATED APPLICATIONS

This application claims priority to U.S. provisional patent application Ser. No. 62/303,103 filed Mar. 3, 2016, by inventors Anish Paul et al. and entitled PATIENT SUPPORT APPARATUS WITH ACTUATOR FEEDBACK, the complete disclosure of which is incorporated herein by reference.

BACKGROUND

The present disclosure relates to patient support apparatuses, such as chairs, beds, stretchers, operating tables, and the like, and more particularly to patient support apparatuses utilizing position feedback to control one or more actuators.

Patient support apparatuses often utilize one or more electric actuators to move one or more components of the patient support apparatus. For example, beds and stretchers often include one or more actuators for tilting the Fowler section of the bed or stretcher, and one or more actuators for tilting the entire patient support deck in order to move the patient support apparatus to a Trendelenburg position or a reverse Trendelenburg position. Such actuators typically include one or more encoders inside of them that output analog signals indicative of a movement of the motor inside of the actuator. These analog encoder signals, however, only provide an indication of changes in position, not an indication of an absolute position. Further, these encoder signals are generated from movement of the motor, not movement of the actuator arm, and therefore may not be truly indicative of the position of the actuator, due to slippage, noise, or other factors, that introduce discrepancies between the motor movement signals and the actual arm movement. As a result, estimates of the position of the actuator arm may not be accurate, thereby rendering accurate control of the actuator difficult.

SUMMARY

The various embodiments of the present disclosure provide improved patient support apparatuses that utilize several techniques for more accurately determining the position of the component(s) moved by the actuator(s). Such improved position estimates enable more accurate control of the actuators and those components of the patient support apparatuses that are moved by such actuators.

According to one embodiment of the disclosure, a patient support apparatus is provided that includes a frame, a support surface for a person, a movable component supported on the frame, an actuator, and a controller. The actuator includes an extendable arm that extends out of, and retracts into, a housing. Inside the housing is a motor, a motor encoder, a spindle powered by the motor, a plurality of power switches, and a position switch. The controller estimates an absolute position of the extendable arm based upon signals from the motor encoder and updates the absolute position estimate when the extendable arm triggers the position switch. Both of the power switches, when triggered by the extendable arm, are adapted to cut power to the motor without intervention by the controller.

According to another embodiment of the disclosure, a patient support apparatus is provided that includes a frame, a support surface for a person, a movable component supported on the frame, an actuator, first and second position switches, and a controller. The actuator includes an extendable arm adapted to move the movable component. The actuator further includes a housing that houses the following components: a motor, a motor encoder, and a spindle powered by the motor and adapted to move the extendable arm. The controller is positioned outside of the housing and estimates an absolute position of the extendable arm based upon signals from the motor encoder. The controller also updates the absolute position estimate of the extendable arm when at least one of the first and second position switches is triggered.

According to another embodiment, a patient support apparatus includes a frame, a support surface, a movable component supported on the frame, an actuator, and a controller. The actuator includes an extendable arm adapted to move the movable component. The actuator further includes a housing having the following components positioned inside of the housing: a brushless DC motor, a motor controller adapted to supply a commutation signal to the brushless DC motor, a spindle powered by the brushless DC motor and adapted to move the extendable arm, and a position switch. The controller is positioned outside of the housing and estimates an absolute position of the extendable arm based upon signals received from the actuator. The controller also updates the absolute position estimate when the extendable arm triggers the position switch.

According to still another embodiment, a patient support apparatus is provided that includes a frame, a support surface, a movable component, an actuator, first and second position switches, and a controller. The actuator includes an extendable arm adapted to move the movable component, as well as a housing that houses a motor and a spindle. The motor powers the spindle and the spindle moves the extendable arm. The first position switch is adapted to be open in a first range of positions of the extendable arm and closed in a second range of positions of the extendable arm. The second position switch is adapted to be open in both a third range and a fourth range of positions of the extendable arm, the third range being a subset of the first range and the fourth range being a subset of the second range. The controller communicates with the first and second position switches and determines in which of the first through fourth ranges the extendable arm is located.

According to still other embodiments, the cutting of power to the motor by the power switches does not cut power to any of the position switches or to the controller.

In some embodiments, the controller outputs the updated absolute position estimate in a digital format.

When updating the absolute position estimate of the extendable arm, in some embodiments, the controller reads from memory a value associated with a position of the position switch. The value is stored in memory during a calibration process of the actuator.

The movable component has a range of movement and, in some embodiments, one or more of the position switches are located at a position inside of the actuator housing corresponding to a high use area of the range of movement.

Some embodiments also include a component switch positioned outside of the actuator housing that is adapted to be triggered when the movable component is in a particular position. The component switch communicates with the controller and the controller updates the absolute position estimate of the extendable arm when the movable component triggers the component switch.

In some embodiments, a counter is positioned inside of the housing that communicates with the motor encoder and the position switch. The counter estimates a position of the extendable arm based upon signals from the motor encoder and updates the absolute position estimate when the extendable arm triggers the position switch. The updating of the absolute position estimate includes resetting the absolute position estimate to a value corresponding to a position of the position switch.

In still other embodiments, the controller is positioned outside of the housing and includes an H-bridge for controlling a speed and a direction of the motor.

The controller, in some embodiments, determines a speed and/or direction of the motor based on the signals from the motor encoder and uses the speed and/or direction determination when updating the absolute position estimate of the extendable arm.

In some embodiments, the patient support apparatus is a chair, the support surface includes a seat, the movable component is a backrest of the chair, and the actuator is adapted to change an orientation of the backrest relative to the seat.

Some embodiments are also configured such that the first position switch is positioned so as to be triggered prior to the extendable arm reaching a first end position defined at a first end of a range of motion of the extendable arm. In such embodiments, the second position switch is positioned so as to be triggered prior to the extendable arm reaching a second end position defined at a second end of the range of motion of the extendable arm. The controller stops the motor prior to the extendable arm reaching either the first or second end positions.

The controller, in some embodiments, is programmed to take the following actions when a first one of the position switches is triggered: read from memory a first value associated with the position of the first position switch, the first value being stored in memory during a calibration process of the actuator; determine a difference between the first value and the absolute position estimate of the extendable arm prior to updating the absolute position estimate; and perform at least one of the following: (a) terminate power to the motor if the difference exceeds a predetermined threshold; and (b) generate an alert signal if the difference exceeds the predetermined threshold.

In some embodiments, the signals received by the controller from the actuator with the DC brushless motor are based upon the commutation signal supplied to the brushless DC motor.

In still other embodiments, the patient support apparatus includes a plurality of position switches and a first unique state of the plurality of position switches exists when the extendable arm is in a first range of positions, a second unique state of the plurality of position switches exists when the extendable arm is in a second range of positions, a third unique state of the plurality of position switches exists when the extendable arm is in a third range of positions, and a fourth unique state of the plurality of position switches exists when the extendable arm is in a fourth range of positions. When so configured, each position switch within the plurality of position switches is triggered by different portions of the extendable arm.

Still further, in some embodiments, the controller is further adapted to determine a discrete position of the extendable arm within one of the first through fourth ranges whenever at least one of the first and second position switches changes states.

Before the various embodiments disclose herein are explained in detail, it is to be understood that the claims are not to be limited to the details of operation or to the details of construction and the arrangement of the components set forth in the following description or illustrated in the drawings. The embodiments described herein are capable of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the claims to any specific order or number of components. Nor should the use of enumeration be construed as excluding from the scope of the claims any additional steps or components that might be combined with or into the enumerated steps or components.

DETAILED DESCRIPTION OF THE EMBODIMENTS

Figure 1:
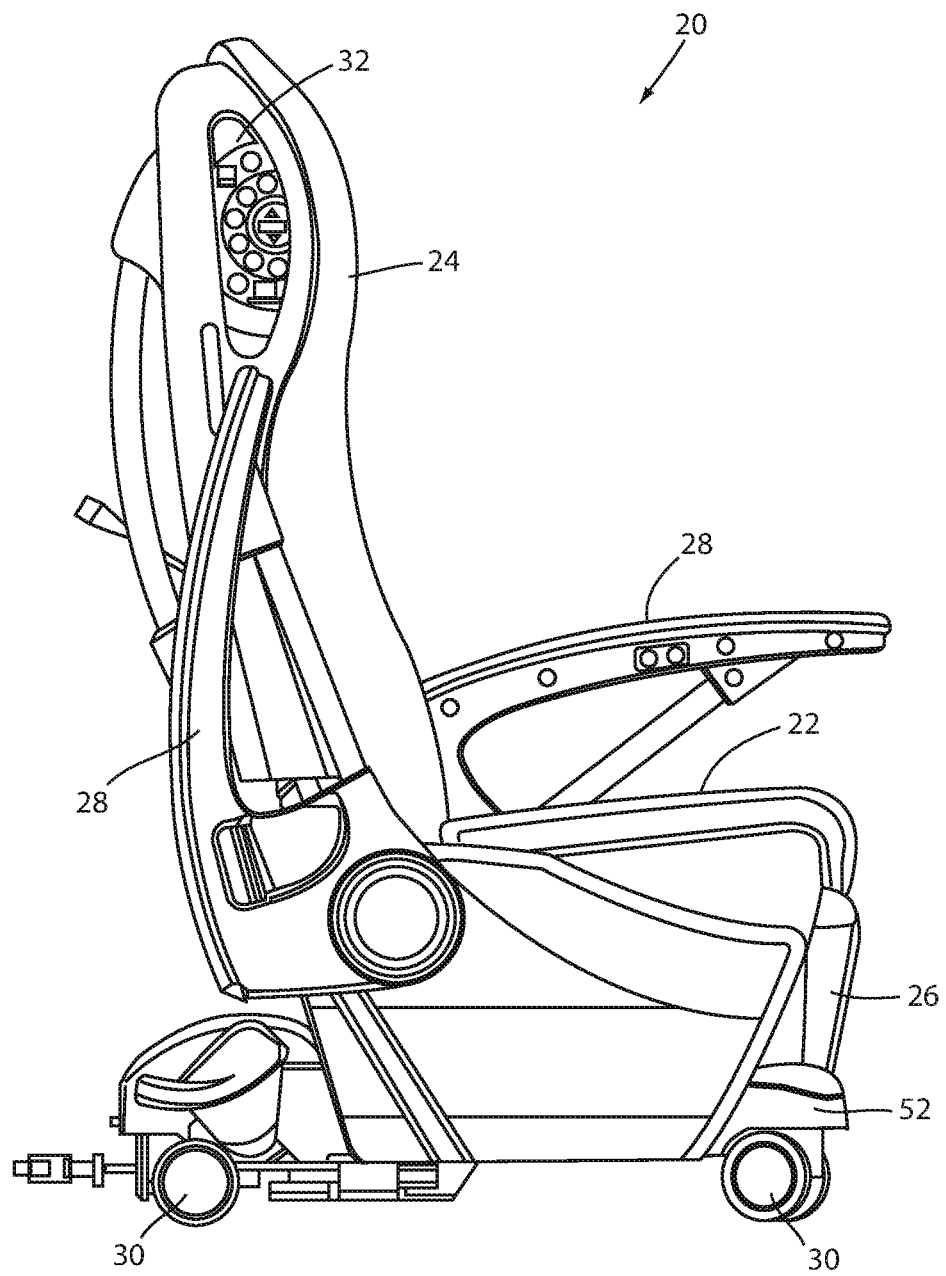
FIG. 1 is a side elevation view of one embodiment of a patient support apparatus according to one aspect of the present disclosure.

A person support apparatus 20 according to one embodiment is shown in FIG. 1. Person support apparatus 20 is shown in FIG. 1 to be a recliner. Although the following written description will be made with respect to a recliner, it will be understood by those skilled in the art that the principles disclosed herein may also be incorporated into other types of person support apparatuses besides recliners, such as, but not limited to, beds, stretchers, cots, surgical tables, chairs, or the like.

Figure 2:
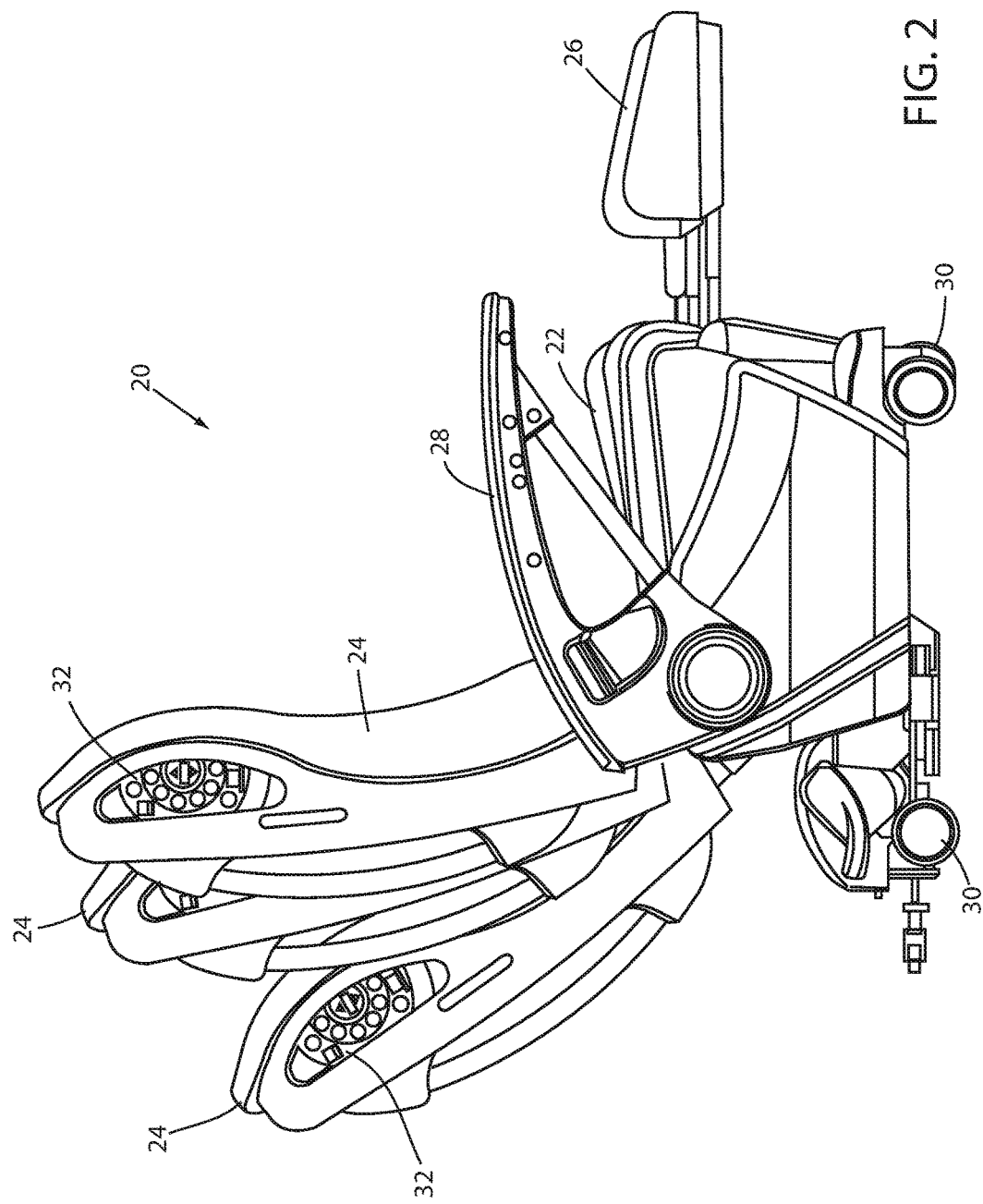
FIG. 2 is a side elevation view of the patient support apparatus of FIG. 1 shown with its backrest pivoted to different positions and its leg rest extended.

Person support apparatus 20 includes a seat 22, a backrest 24, a leg rest 26, a pair of armrests 28, and a plurality of wheels 30 (FIGS. 1 & 2). Person support apparatus 20 is constructed such that both the height and tilt of seat 22 is adjustable. Further, person support apparatus 20 is constructed such that backrest 24 is pivotable between a generally upright position, such as shown in FIG. 1, and a virtually infinite number of rearwardly reclined positions, several of which are illustrated in FIG. 2. Leg rest 26 is constructed such that it is able to be moved between a retracted position, such as shown in FIG. 1, and an extended position in which leg rest 26 is oriented generally horizontally and extends forwardly from seat 22, such as shown in FIG. 2. Armrests 28, in the illustrated embodiment, are constructed such that a user can manually pivot them between a lowered position and a raised position. FIG. 1 illustrates one of the armrests 28 in the raised position and the other of the armrests 28 in the lowered position.

In at least one embodiment, those components of person support apparatus 20 that are not explicitly described herein are constructed in accordance with any of the embodiments disclosed in commonly assigned, copending U.S. patent application Ser. No. 14/212,253 filed Mar. 14, 2014 by inventors Christopher Hough et al. and entitled MEDICAL SUPPORT APPARATUS, the complete disclosure of which is incorporated herein by reference. The movement and control of person support apparatus 20 may also be carried out in accordance with the disclosures of commonly assigned, copending U.S. patent application Ser. No. 14/801,167 filed Jul. 16, 2015 by inventors Anish Paul et al. and entitled MEDICAL SUPPORT APPARATUS, and/or commonly assigned, copending U.S. patent application Ser. No. 14/984,403 filed Dec. 30, 2015, by inventors Anish Paul et al. and entitled PERSON SUPPORT APPARATUS WITH PIVOTING BACKREST, the complete disclosures of both of which are also incorporated herein by reference. Person support apparatus 20 may also be constructed in other manners besides those described in these three commonly assigned patent applications.

Figure 3:
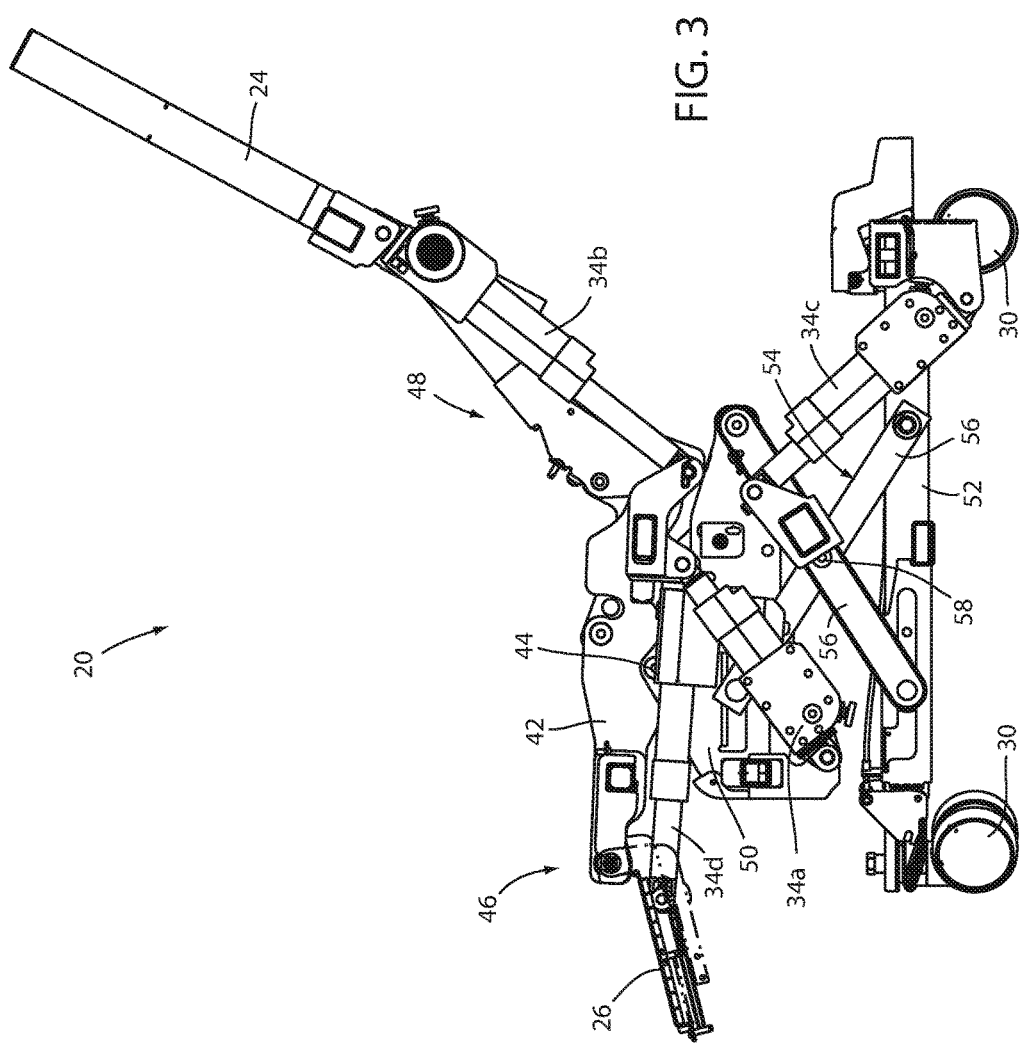
FIG. 3 is a side elevation view of the patient support apparatus of FIG. 1 shown with several components removed in order to illustrate a plurality of actuators incorporated into the patient support apparatus.

A control panel 32 is provided on each side of backrest 24 (one of which is shown in FIGS. 1 and 2). Control panels 32 are manipulated by a user in order to control the movement and other functions of person support apparatus 20. Control panels 32 communicate with one or more microcontrollers that control the movement of a plurality of actuators 34a, b, c, and d. As can be seen in FIG. 3, the specific actuators of patient support apparatus 20 include a seat actuator 34a, a backrest actuator 34b, a lift actuator 34c, and a leg rest actuator 34d. Each of actuators 34a, 34b, 34c, and 34d are motorized linear actuators that are designed to linearly extend and retract under the control of a controller, such as, but not limited to, a microcontroller.

When seat actuator 34a extends or retracts, it causes a seat frame 42 to pivot about a seat pivot axis 44. The extension of seat actuator 34a therefore causes seat frame 42 to tilt in such a manner that a forward end 46 of seat 22 moves downward relative to a backward end 48 of seat 22 (i.e. seat frame 42 rotates in a counterclockwise direction as shown in FIG. 3). The retraction of seat actuator 34a, in contrast, causes seat frame 42 to tilt in the opposite manner (i.e. seat frame 42 rotates in a clockwise direction as shown in FIG. 3). Seat pivot axis 44 is defined where seat frame 42 is pivotally mounted to a chair frame 50 (FIG. 3). As will be discussed further below, chair frame 50 is height adjustable, and the raising or lowering of chair frame 50 has the effect of raising or lowering seat frame 42, as well as those components coupled to seat frame 42 (e.g. backrest 24 and leg rest 26).

Backrest actuator 34b is mounted to backrest 24 and to seat frame 42. The extension of backrest actuator 34b causes backrest 24 to pivot in a counterclockwise direction in FIG. 3, while the retraction of backrest actuator causes backrest 24 to rotate in a clockwise direction in FIG. 3. Because backrest 24 is coupled to seat frame 42, the rotation of seat frame 42 by seat actuator 34a also causes backrest 24 to rotate with respect to the floor as seat frame 42 rotates. This rotation, however, is independent of the rotation of backrest 24 caused by backrest actuator 34b. In other words, the relative angle between backrest 24 and seat frame 42 only changes when backrest actuator 34b is actuated (and not when seat actuator 34a extends or retracts while backrest actuator 34b does not change length). The angle of backrest 24 with respect to the floor (or another fixed reference), however, changes as seat frame 42 pivots about seat pivot axis 44, or as backrest actuator 34b pivots backrest 24.

Leg rest actuator 34d is mounted to seat frame 42 and to leg rest 26. The extension of leg rest actuator 34d therefore pivots leg rest 26 from a retracted position (e.g. FIG. 1) to an extended position in front of seat 22 (FIG. 2). The physical construction of leg rest 26 may take on any of the forms disclosed in the commonly assigned U.S. patent application Ser. No. 14/212,253 mentioned above, whose disclosure is incorporated completely herein by reference. Other physical constructions of leg rest 26 are also possible. The extension and retraction of leg rest actuator 34d changes the orientation of leg rest 26 with respect to seat frame 42. The orientation of leg rest 26 with respect to seat frame 42 does not change based on the extension or contraction of any other actuators 34a, 34b, or 34c. The orientation of leg rest 26 with respect to the floor (or some other fixed reference), however, changes when seat frame 42 is pivoted about seat pivot axis 44 by seat actuator 34a, or when leg rest actuator 34d pivots leg rest 26. In summary, then, the pivoting of seat frame 42 about its pivot axis 44 therefore simultaneously changes the orientations of all of seat 22, backrest 24, and leg rest 26 with respect to the floor (or other fixed reference), but does not, by itself, change the orientations of any of these components (seat 22, backrest 24, and leg rest 26) with respect to each other.

Lift actuator 34c is coupled to a base 52 by an X-frame 54. X-frame 54 includes two legs 56 that are pivotally coupled to each other about a center axis 58. When lift actuator 34c extends or retracts, the relative angle between each of the legs 56 changes, thereby changing the overall height of X-frame 54. Further, because frame 50 is mounted on a top end of X-frame 54, the changing height of X-frame 54 changes the height of frame 50. Lift actuator 34c therefore raises the height of frame 50 when it extends and lowers the height of frame 50 when it retracts. Because seat frame 42 is mounted (pivotally) on frame 50, and because backrest 24 and leg rest 26 are both mounted to seat frame 42, raising and lowering the height of frame 50 simultaneously raises and lowers the height of seat 22, backrest 24, and leg rest 26. However, extending and retracting lift actuator 34c does not, by itself, change the angular orientations of any of leg rest 26, backrest 24, and/or seat 22, either with respect to each other or with respect to the floor.

In one embodiment, each of the actuators 34a-34d are linear actuators that are marketed by Ilcon Actuator Corp. of Holland, Mich., under the name IlcoDrive OZ, and that have been modified to include one or more position switches, as will be discussed in greater detail below. Such actuators are each powered by a brushed DC motor. Other types and brands of linear actuators may be used in accordance with any of the principles disclosed herein. In at least one alternative embodiment, one or more of the actuators 34a-34d are actuators powered by a brushless DC motor, as will be discussed in greater detail below.

Each of the actuators 34a-34d extends or retracts in response to its associated motor being driven in one direction or its opposite direction. The control of each motor is carried out by a control system 102 (FIG. 10) in communication with control panels 32. Control panels 32 may be constructed in the same manner as, operate in the same manner as, and/or carry out any one or more of the same functions that are carried out using the control panels disclosed in any of the following commonly assigned U.S. patent applications: Ser. No. 14/838,693 filed Aug. 28, 2015 by inventors Daniel Brosnan et al. and entitled PERSON SUPPORT APPARATUS WITH ACTUATOR BRAKE CONTROL; Ser. No. 14/549,006 filed Nov. 20, 2014 by inventors Richard Derenne et al. and entitled PERSON SUPPORT APPARATUSES WITH VIRTUAL CONTROL PANELS; Ser. No. 62/166,354 filed May 26, 2015 by inventors Michael Hayes et al. and entitled USER INTERFACES FOR PATIENT CARE DEVICES; Ser. No. 62/171,472 filed Jun. 5, 2015 by inventors Aaron Furman et al. and entitled PATIENT SUPPORT APPARATUSES WITH DYNAMIC CONTROL PANELS; and Ser. No. 62/186,464 filed Jun. 30, 2015 by inventors Marko Kostic et al. and entitled PERSON SUPPORT APPARATUSES WITH LOAD CELLS, the complete disclosures of all of which are hereby incorporated herein by reference in their entirety.

FIGS. 4-7 illustrate in greater detail an illustrative embodiment of an actuator 34 that may be used as any one of the actuators 34a-34d of patient support apparatus 20. That is, actuator 34 may be used as seat actuator 34a, backrest actuator 34b, lift actuator 34c, and/or leg rest actuator 34d. It will also be understood that other types of actuators that vary from the specific one shown in FIGS. 4-7 may be used in any of the embodiments disclosed herein.

Figure 4:
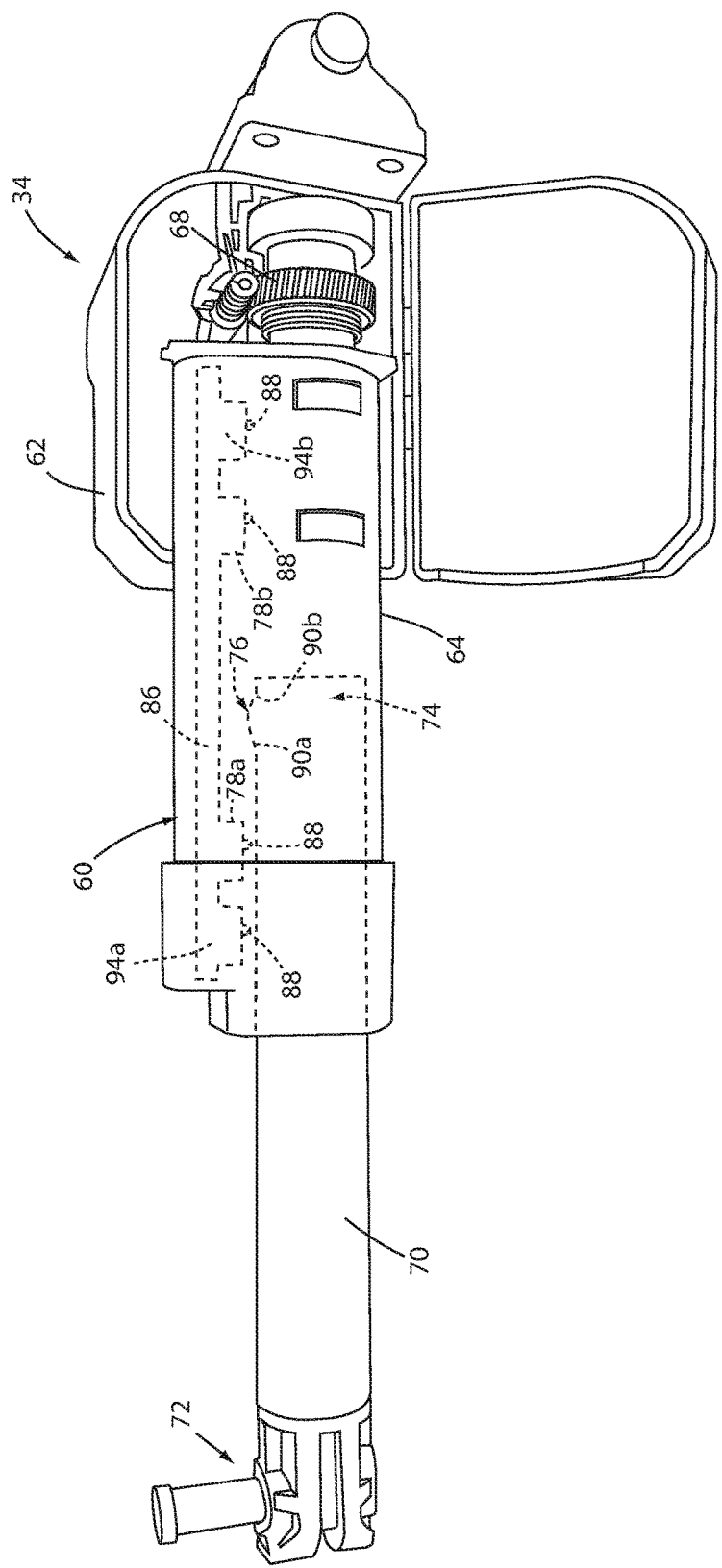
FIG. 4 is a side elevation view of an actuator used with the patient support apparatus of FIG. 1.
Figure 5:
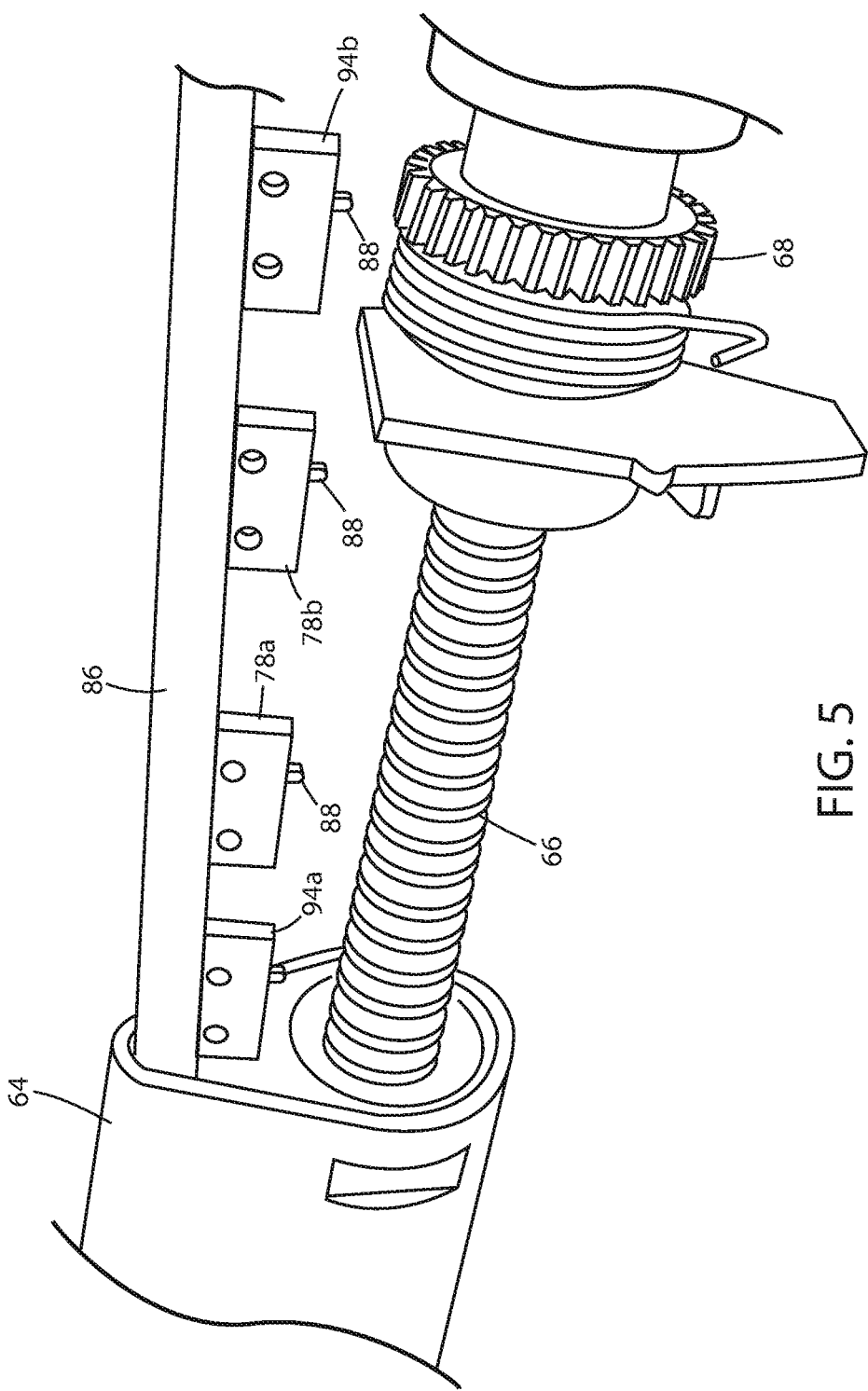
FIG. 5 is an exploded perspective view of several internal components of the actuator of FIG. 4.

Actuator 34 includes a housing 60 having a motor portion 62 and a spindle portion 64. Motor portion 62 houses a motor 82 (not visible in FIGS. 4-7, but shown in FIG. 10) and spindle portion 64 house a spindle 66 (FIG. 5). One or more gears 68 are positioned at the junction of motor portion 62 and spindle portion 64. Gears 68 transfer the rotational motion of the motor 82 to spindle 66. The rotation of spindle 66, in turn, extends or retracts an extendable arm 70, depending upon the direction of rotation of spindle 66. Extendable arm 70 includes an attachment end 72 and an internal end 74 (FIGS. 4 and 7). Attachment end 72 is attached to a movable component of patient support apparatus 20, such as seat frame 42, chair frame 50, or leg rest 26. Internal end 74 is housed within spindle portion 64 of housing 60 and includes one or more tabs 76 (FIGS. 4 & 7), as will be discussed in greater detail below.

Control system 102 controls actuators 34a-d by using feedback from a plurality of sensors that are indicative of the position of extendable arm 70. That is, control system 102 uses position feedback for carrying out closed-loop control of the motors 82 of actuators 34a-d. The position feedback may be generated in a variety of different manners as will be discussed in greater detail below. In the embodiment shown in FIGS. 4-7, control system 102 receives position information from first and second position switches 78a and 78b, as well as one or more encoders 80 (FIG. 10) positioned inside of motor portion 62 of housing 60. Encoders 80 may be a pair of conventional incremental rotary encoders that output a pair of quadrature signals indicative of movement of the rotor of motor 82. That is, the output wave forms of each of the encoders 80 is ninety degrees out of phase. Each of the output waveforms comprises a series of pulses wherein each pulse represents a fraction of one revolution of the rotor of motor 82. By analyzing the order in which the quadrature signals are output from encoders 80, the direction of rotation of motor 82 can be determined. Further, by analyzing how fast the pulses are output from encoders 80, the speed of rotation of motor 82 can also be determined. Still further, by utilizing the known gear ratio between motor 80 and spindle 66, which is stored in a memory 84 (FIG. 10), control system 102 can estimate the relative amount of extension or retraction of extendable arm 70 from its initial position.

Encoders 80, however, do not provide an absolute position of extendable arm 70. This is because encoders 80 only indicate how much motor 82 has rotated (and in which direction) and are unable to sense the initial position of motor 82 prior to its rotation. Without this initial position information, encoders 80 can only determine how many times motor 82 has rotated, but cannot determine the final position of motor 82. The information provided by encoders 80 is also limited by the fact that encoders 80 only measure the rotation of motor 82, not the rotation of spindle 66. Although spindle 66 is mechanically coupled to motor 82 via gears 68, the movement of motor 82 may not be an accurate of indication of the movement of spindle 66 for at least two reasons. First, there may be mechanical slippage between motor 82 and spindle 66. Second, there may be noise, or other transients, that are present in the quadrature signals output from encoders 80 that either appear to indicate some degree of motor movement that is not actually present, or that mask some degree of motor movement that is actually present. For either of these reasons, the number of rotations of motor 82 as sensed by encoders 80 may not provide an accurate basis for determining the absolute position of extendable arm 70.

Figure 6:
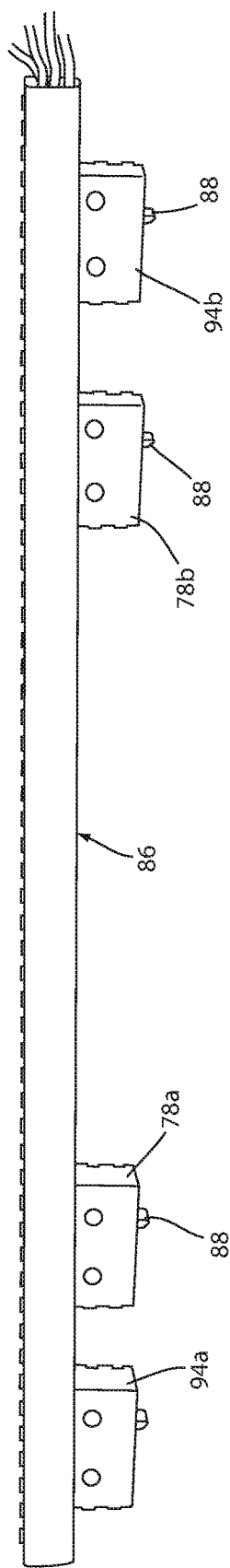
FIG. 6 is a side elevation view of a switch bar of the actuator of FIG. 4.
Figure 7:
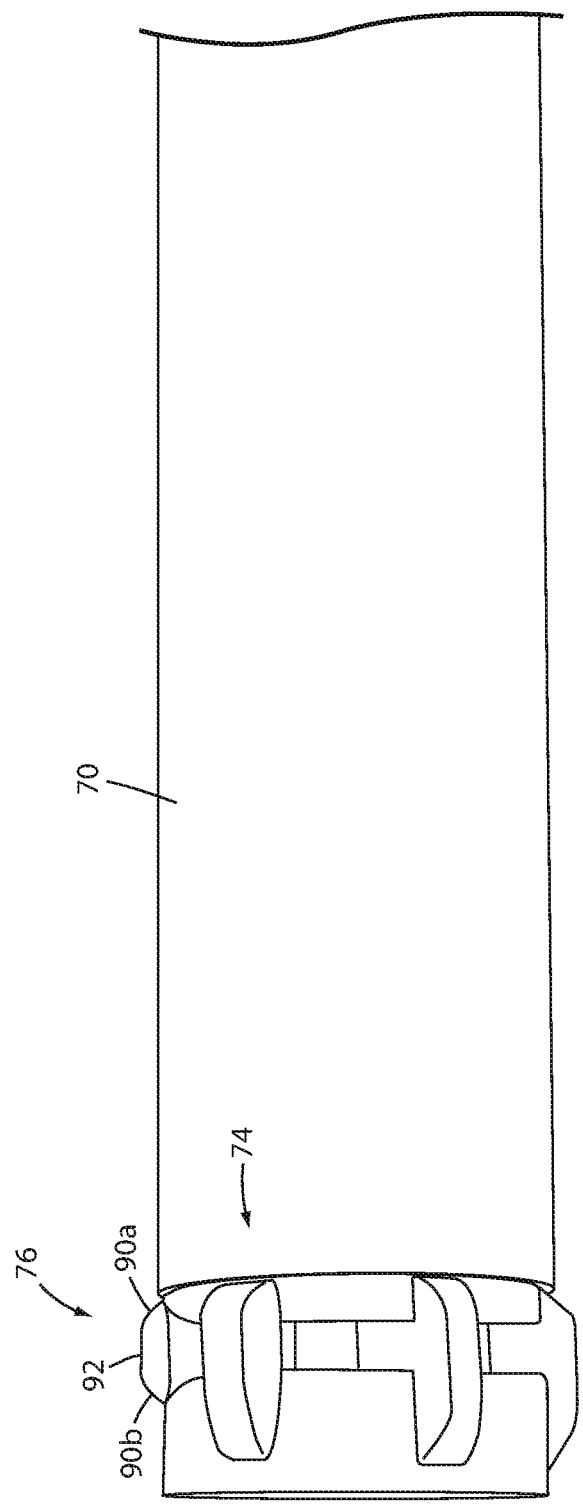
FIG. 7 is a side view of an internal end of an actuator arm.

These shortcomings are addressed by position switches 78a and 78b (FIGS. 4-6). Position switches 78a and 78b provide absolute position indications of extendable arm 70, and these absolute position indications are based on direct physical contact with extendable arm 70, rather than measurements of motor 82's movement and the assumption that motor 82's movements are translated in a known manner (gear ratio) to spindle 66. As shown in FIG. 4, actuator 34 includes two position switches 78a and 78b. Position switches 78a and 78b are attached to a switch bar 86 (FIGS. 4-6) that is housed inside of spindle portion 64 of housing 60. Position switches 78a and 78b are positioned inside spindle portion 64 in a manner such that at least one tab 76 positioned adjacent internal end 74 of extendable arm 70 comes into contact with and trips switches 78a and 78b as extendable arm 70 extends and retracts.

As can be seen in FIGS. 4-6, each position switch 78a and 78b includes a pin 88 that faces extendable arm 70. Pins 88 are movable toward and away from the longitudinal axis of extendable arm 70. As extendable arm 70 is extended further and further out of spindle portion 64 of housing 60, tab 76 on extendable arm 70 eventually comes into contact with pin 88 of position switch 78a. As can be seen more clearly in FIG. 7, tab 76 includes a front sloped surface 90a, a rear sloped surface 90b, and a top surface 92 positioned between front and rear sloped surfaces 90a and 90b. When extending, front sloped surface 90a is the first portion of tab 76 to come into contact with pin 88 of position switch 78a. The sloped nature of front sloped surface 90a urges pin 88 of position switch 78a inward (into the body of switch 78a and away from the longitudinal axis of spindle 66) as extendable arm 70 extends. This inward urging triggers position switch 78a. This inward urging continues until top surface 92 of tab 76 comes into contact with pin 88 of position switch 78a, at which point pin 88 is pushed into the body of position switch 78a as far as tab 76 is capable.

As extendable arm 70 continues to extend, pin 88 of position switch 78a slides along the length of top surface 92 until it reaches rear sloped surface 90b, at which point pin 88 begins to extend back out of the main body of position switch 78a. Further extension of extendable arm 70 allows pin 88 to extend fully outward after rear sloped surface 90b passes by position switch 78a.

When pin 88 is pushed inward by tab 76, it opens position switch 78a, which is a normally closed switch. It will be understood, however, that in other configurations position switch 78a could be a normally open switch wherein the pressing of pin 88 by tab 76 causes switch 78a to close. As will be discussed in greater detail below, the inward pressing of pin 88 by tab 76 provides a signal to control system 102 indicating the absolute position of extendable arm 70 at the moment when tab 76 has pressed pin 88. As will also be discussed in greater detail below, this signal is used by control system 102 to update a previously generated estimate of the position of extendable arm that is based upon the outputs from encoders 80.

As extendable arm 70 retracts back into spindle portion 64 of housing 60, tab 76 on extendable arm 70 eventually comes into contact with pin 88 of position switch 78a. When retracting, rear sloped surface 90b is the first portion of tab 76 to come into contact with pin 88 of position switch 78a. The sloped nature of rear sloped surface 90b urges pin 88 of position switch 78a inward (into the body of switch 78a and away from the longitudinal axis of spindle 66) as extendable arm 70 retracts. This inward urging triggers position switch 78a. This inward urging continues until top surface 92 of tab 76 comes into contact with pin 88 of position switch 78a, at which point pin 88 is pushed into the body of position switch 78a as far as tab 76 is capable. The continued retraction of extendable arm 70 causes pin 88 of position switch 78a to slide along the length of top surface 92 until it reaches front sloped surface 90a, at which point pin 88 begins to extend back out of the main body of position switch 78a. Further retraction of extendable arm 70 allows pin 88 to extend fully outward after front sloped surface 90a passes by position switch 78a.

The interaction of tab 76 with position switch 78b works in the same manner as the interaction of tab 76 with position switch 78a. That is, tab 76 pushes in pin 88 of position switch 78b as tab 76 passes by, thereby triggering switch 78b. In the disclosed embodiment, position switch 78b is a normally closed switch that is opened when triggered by tab 76. However, as with position switch 78a, position switch 78b can be modified in alternative embodiments to be a normally open switch that is closed when triggered by tab 76.

As can be seen in FIGS. 4-6, switch bar 86 also includes a pair of power switches 94a and 94b that are attached thereto. Power switches 94a and 94b are positioned closer to the ends of switch bar 86 than position switches 78a and 78b. Power switches 94a and 94b are triggered in the same manner as position switches 78a and 78b by tab 76. Power switches 94a and 94b, as will be discussed in greater detail below, are configured via hardware to automatically cut off power to motor 82 in one direction when triggered by tab 76. Power switches 94a and 94b therefore define the limits of motion of extendable arm 70. Specifically, when extendable arm 70 extends out of spindle portion 64 of housing 60 sufficiently far such that tab 76 triggers power switch 94a, power is cut to motor 82 in such a manner that motor 82 can extend no farther out of spindle portion 64 (although power is still able to be supplied to allow extendable arm 70 to retract). Conversely, when extendable arm 70 retracts back into spindle portion 64 of housing 60 sufficiently far such that tab 76 triggers power switch 94b, power is cut to motor 82 in such a manner that motor 82 can retract no further inward, although power is still able to be supplied to allow extendable arm 70 to extend.

Figure 8:
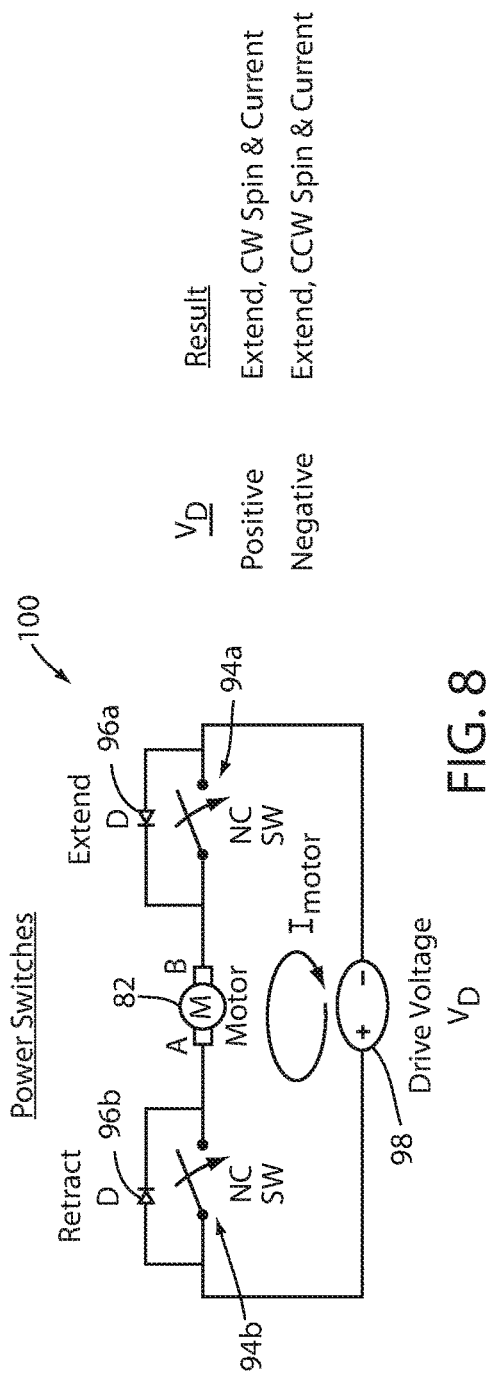
FIG. 8 is a circuit diagram of a motor power circuit used with the motor of the actuator of FIG. 4.

FIG. 8 illustrates an electrical schematic of one embodiment of a power control circuit 100 having power switches 94a and 94b. As shown therein, each power switch 94a and 94b is shunted with a diode 96a and 96b. A drive voltage 98 supplies electrical current to motor 82. When neither power switch 94a nor power switch 94b is triggered, current is able to flow through both switches 94a and 94b (as well as one of the diodes 96a or 96b, depending upon which direction the current is flowing). When extendable arm 70 is fully extended and its tab 76 triggers power switch 94a, power switch 94a opens. This prevents current from flowing through switch 94a in either direction. Current is also prevented from flowing through diode 96a in a clockwise direction in FIG. 8. That is, when drive voltage 98 is positive, which drives motor 82 in a direction that causes extension of extendable arm 70, current is unable to flow to motor 82 due to the reverse biasing of diode 96a. The opening of switch 96a therefore cuts off current to motor 82 that would otherwise cause further extension of extendable arm 70. Current, however, is still able to flow in the opposite direction through diode 96a, thereby allowing extendable arm 70 to retract. Specifically, current is able to flow through diode 96a (and thus to motor 82) when drive voltage 98 is negative. As viewed in FIG. 8, this counterclockwise current therefore enables motor 82 to be driven in a manner that retracts extendable arm 70. Power switch 94a therefore stops actuator 34 from extending further by cutting off power to motor 82 in the extension direction.

Power switch 94b operates in a similar manner to power switch 94a but cuts off power when extendable arm has reached its retraction limit, rather than its extension limit. That is, power switch 94b prevents further retraction of extendable arm 70 by cutting off current to motor 82 that flows in the direction that causes retraction of extendable arm 70. Power switch 94b, however, still allows current to be supplied to motor 82 in a direction that causes extension of extendable arm 70. Specifically, when tab 70 of extendable arm 70 triggers power switch 94b, power switch 94b is opened, preventing any current from flowing to motor 82 that does not forward bias diode 96b. Because the current responsible for retracting extendable arm 70 reverse biases diode 96b, further powered retraction of extendable arm 70 is prevented when power switch 94b is triggered. Conversely, because the current responsible for extending extendable arm 70 forward biases diode 96b, extension of extendable arm 70 is still possible. Power switches 94a and 94b thereby cut off electrical current in one direction only, and do so in a manner that prevents extendable arm 70 from moving beyond the limits defined by power switches 94a and 94b.

It should be noted that the termination of power to motor 82 caused by the opening of power switches 94a and 94b is carried out purely in hardware. There is no software control that is involved in this power cut off. As a result, any software errors, bugs, or other malfunctions of a microcontroller, or other type of programmed controller, do not affect the operation of power switches 94a or 94b. Power switches 94a and 94b therefore act as hardware safety devices that prevent actuator 34 from either over-extending or over-retracting.

Figure 9:
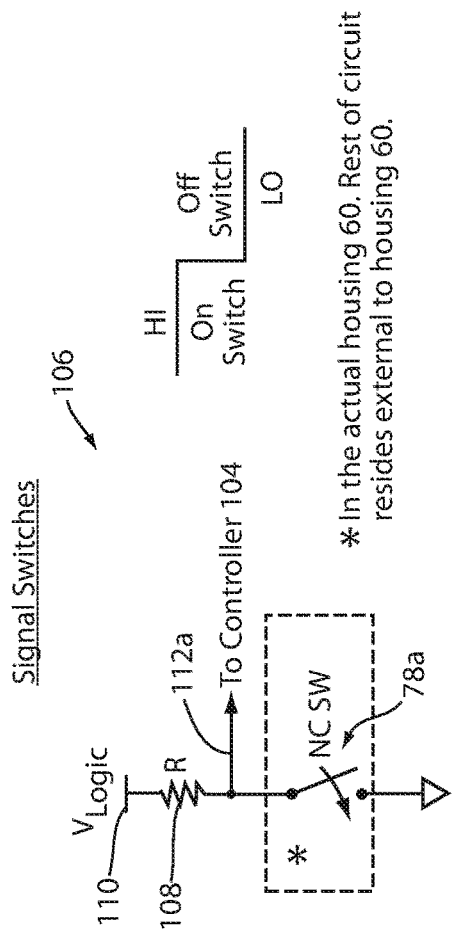
FIG. 9 is a circuit diagram of a signal switch used with the actuator of FIG. 4.

FIG. 9 illustrates one embodiment of a position switch circuit 106. Position switch circuit 106 includes a position switch, such as position switch 78a, that is wired in electrical series with a resistor 108. Resistor 108 is coupled to a logic voltage source, such as, but not limited to, 5 volts or 3.3 volts. A sense line 112a is electrically coupled to a tap point between resistor 108 and switch 78a. Sense line 112 feeds into a controller 104 (FIG. 10), as will be discussed in greater detail below. When position switch 78a is in its normally closed state (i.e. not triggered by tab 76), sense line 112a feeds a low voltage signal to controller 104. When position switch 78a is triggered by tab 76 and moves to the open position, sense line 112a is pulled into a high voltage state and this high voltage is fed into controller 104. Controller 104 is therefore able to determine the state of position switch 78a. A similar position switch circuit 106 is used for position switch 78b and includes a separate sense line 112b that feeds into controller 104. Controller 104 is therefore simultaneously fed the state of both of position switches 78a and 78b via lines 112a and 112b, respectively.

Figure 10:
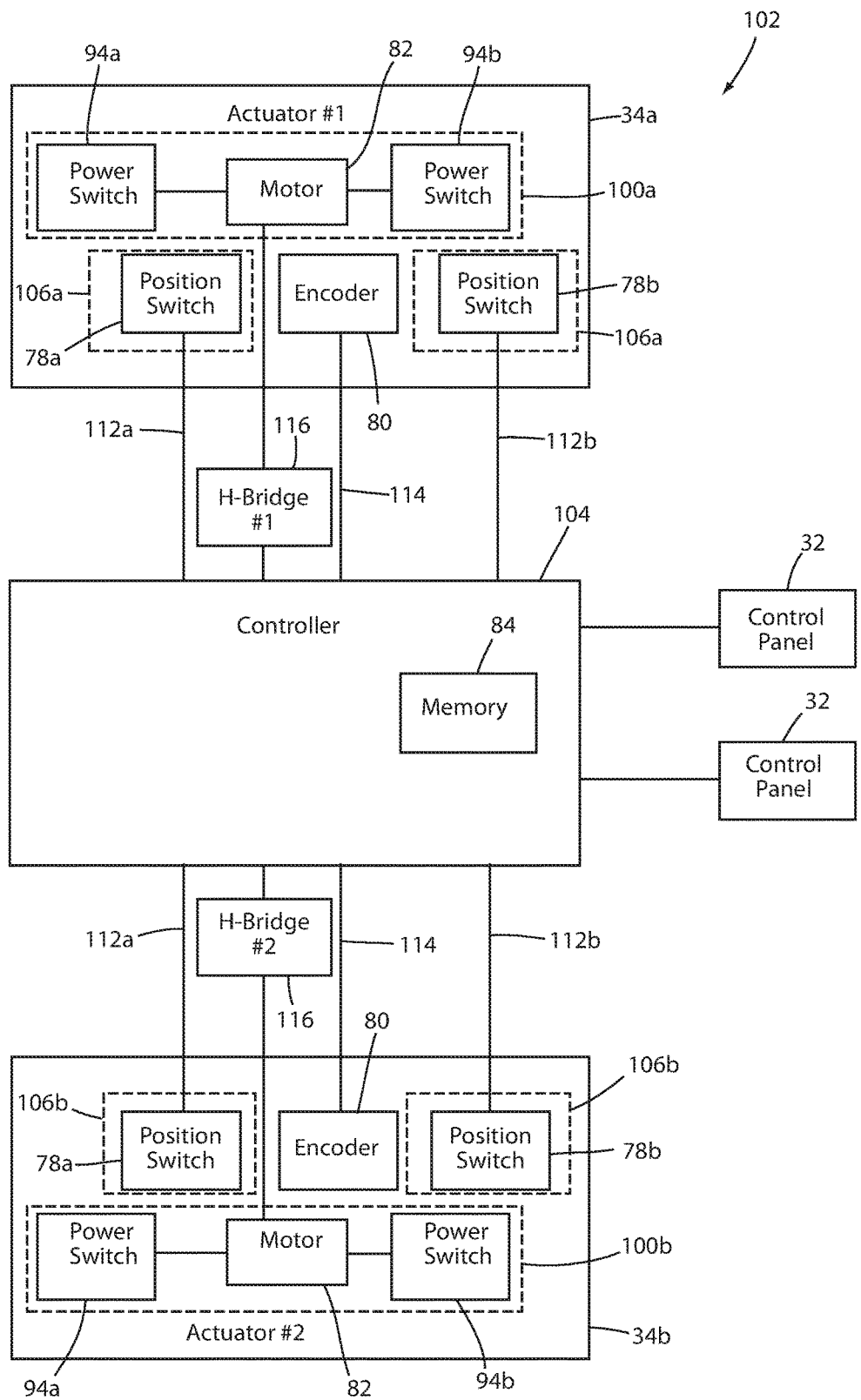
FIG. 10 is a diagram of a control system that may be used to control a pair of actuators of the patient support apparatus of FIG. 1.

As shown more clearly in FIG. 10, controller 104 is part of control system 102. Control system oversees and coordinates the movement of actuators 34a-34d. Although FIG. 10 only illustrates a control system 102 having two actuators 34a and 34b, it will be understood that this is merely for purposes of illustration. When control system 102 is used with a patient support apparatus having more than two actuators 34, such as patient support apparatus 20 of FIG. 1, control system 102 is modified to include additional actuators 34 that are operated under the control of controller 104. The control of such additional actuators 34 is carried out in the same manner as the control of actuators 34a and 34b in FIG. 10, which will be discussed in greater detail below.

Controller 104 is in communication with actuators 34a and 34b, as well as one or more control panels 32. Although not shown, controller 104 may also be in communication with a brake, a brake sensor, and/or an exit detection system. The exit detection system may be configured in the manner disclosed in commonly assigned copending application Ser. No. 62/268,549 filed Dec. 17, 2015 by inventors Anish Paul et al. and entitled PERSON SUPPORT APPARATUS WITH EXIT DETECTION SYSTEM, the complete disclosure of which is hereby incorporated herein by reference. Alternative configurations are also possible.

Controller 104 is constructed of any electrical component, or group of electrical components, that are capable of carrying out the functions described herein. In many embodiments, controller 104 is a conventional microcontroller, although not all such embodiments need include a microcontroller. In general, controller 104 may include any one or more microprocessors, field programmable gate arrays, systems on a chip, volatile or nonvolatile memory, discrete circuitry, and/or other hardware, software, or firmware that is capable of carrying out the functions described herein, as would be known to one of ordinary skill in the art. Such components can be physically configured in any suitable manner, such as by mounting them to one or more circuit boards, or arranging them in other manners, whether combined into a single unit or distributed across multiple units. The instructions followed by controller 104 in carrying out the functions described herein, as well as the data necessary for carrying out these functions are stored in memory 84. Although memory 84 is depicted in FIG. 10 as being part of controller 104, it will be understood that memory 84 may reside partially or wholly off-board controller 104 if controller 104 is implemented as a microcontroller, or some other form of integrated circuit.

In one embodiment, controller 104 communicates with individual circuit boards contained within each control panel 32 using an I-squared-C communications protocol. It will be understood that, in alternative embodiments, controller 104 could use alternative communications protocols for communicating with control panels 32 and/or with the other components of control system 102. Such alternative communication protocols include, but are not limited to, a Controller Area Network (CAN), a Local Interconnect Network (LIN), Firewire, one or more Ethernet switches, such as disclosed in commonly assigned, copending U.S. patent application Ser. No. 14/622,221 filed Feb. 13, 2015 by inventors Krishna Bhimavarapu et al. and entitled COMMUNICATION METHODS FOR PATIENT HANDLING DEVICES, the complete disclosure of which is incorporated herein by reference. Still other forms of communication are possible.

Controller 104 is in communication with each encoder 80 via an input line 114. Input line 114 feeds the quadrature encoder signals to controller 104 that are indicative of movement of motor 82, as discussed previously. Controller 104 uses these signals to confirm the direction in which motor 82 is turning, as well as to generate an estimate of the current position of extendable arm 70. In order for controller 104 to generate an estimate of the absolute position of extendable arm 70, each actuator 34 must be calibrated. During the calibration process, the extendable arm 70 is moved in a controlled manner past one of position switches 78a or 78b so that controller 104 is able to determine the absolute position of extendable arm. Controller 104 determines this absolute position based upon values stored in memory 84 that correspond to the precise location of each of position switches 78a and 78b. In one embodiment, these position values are determined by the manufacturer of the actuator 34 and stored in memory 84 for each of the actuators 34. The calibration process is carried out by assigning the position of extendable arm 70 to one of these values when extendable arm triggers one of these switches 78a or 78b. Prior to this calibration, controller 104 is able to infer relative position changes of extendable arm 70 via signals from encoders 80, but is not able to determine an absolute position of extendable arm 70. After calibration, controller 104 knows the absolute position of extendable arm 70 and maintains a running estimate of this absolute position value via the signals from encoders 80.

In one embodiment, the position of each of these switches 78a and 78b is demarcated using units of encoder pulses or counts. In such an embodiment, an arbitrary position of extendable arm 70 is initially selected by the actuator manufacturer as corresponding to a zero pulse location. As one example, the position of extendable arm 70 when it is fully retracted inside of housing 60 could be defined as the zero pulse location. Other locations, of course, can be used. Regardless of the location of the zero pulse position, the pulse position of position switches 78a and 78b is known and those values are stored in memory 84.

During calibration the actuator is moved relatively slowly until tab 76 on extendable arm 70 triggers one of the position switches 78. At the moment the position switch 78 is triggered, controller 104 assigns the known position of the triggered switch 78 to the current position of extendable arm 70. Thus, for example, if position switch 78a is located at pulse count location 5,000, controller 104 assigns a pulse count of 5000 to the position of extendable arm 70 at the moment extendable arm triggers position switch 78a. Any subsequent movement of extendable arm is detected via additional pulses from encoders 80. These additional pulses are either added to or subtracted from the 5000 count value, depending upon the direction of motion. In this manner, controller 104 keeps a running estimate of the absolute position of extendable arm 70.

In other words, once the location of position switch 78a is determined via the calibration process, all subsequent movement is accounted for by monitoring the pulse counts from encoders 80. Thus, as one example, if position switch 78a is located at, say, 5000 pulse counts, and extendable arm 70 is extended inward 100 pulse counts (as determined by encoders 80), controller 104 estimates the then current absolute position of extendable arm 70 as being at 4900 pulse counts (5000 pulse counts minus 100 pulse counts). If extendable arm 70 is subsequently retracted another 2000 pulse counts, controller 104 estimates its absolute position as being at 2900 pulse counts. Controller 104 therefore keeps a running estimate of the current absolute position of extendable arm 70 based on the encoder outputs.

Whenever extendable arm 70 is moved such that one of position switches 78a or 78b is triggered, controller 104 updates this running estimate of the current absolute position of extendable arm 70 based upon the stored value corresponding to the position of position switches 78a or 78b. That is, controller 104 compares the running estimate of the absolute position of extendable arm 70 at the moment it triggers a switch 78 with the calibration value stored in memory 84 for that particular position switch 78. If there is no difference, then the running estimate of the absolute position of extendable arm 70 is not changed. If there is a discrepancy, then the running estimate is changed to match the calibration value stored in memory 84.

For example, if position switch 74a is determined during the calibration process to be located at pulse count 5000, and the running estimate of extendable arm 70 at the moment it triggers position switch 74 is, say, 4900 pulse counts (due to, for example, slippage, incorrect pulse counts, or other errors), controller 104 replaces the 4900 pulse counts running estimate with the 5000 pulse count value stored in memory 84. During further movement thereafter, controller 104 uses encoder pulses to add to, or subtract from, the 5000 pulse count value to maintain an updated running estimate of the absolute position of extendable arm 70. Position switches 78a and 78b thereby enable controller 104 to remove any accumulated errors in the encoder-derived position estimate of extendable arm 70 whenever tab 76 triggers either of these switches 78a or 78b.

In order to ensure that the running estimate of the position of extendable arm 70 based on encoder outputs is updated sufficiently often to remove any potential accumulated errors, the positions of switches 78a and 78b are chosen to correspond to locations where extendable arm 70 of actuator 34 is expected to frequently travel. Thus, for example, if backrest 24 is not expected to be pivoted fully backward to its generally horizontal orientation very often, at least one of the position switches 78a and 78b should be positioned at a location along switch bar 86 that corresponds to a more upright position of backrest 24. In this manner, the time periods between the triggering of one or both of position switches 78a and 78b is reduced, thereby providing more frequent updates to the running position estimate, and thereby ensuring better accuracy of the running position estimate.

In some embodiments, controller 104 is programmed to also evaluate the magnitude of any difference between the running estimate of the position of extendable arm 70 and the updated position provided when one of switches 78a or 78b is triggered. If this difference exceeds a predetermined threshold stored in memory 84, then controller 104 takes one or both of the following: (1) issues an alert, or (2) stops motor 82. These actions may be taken because a discrepancy between the running position estimate and the update provided by position switches 78a or 78b that is unusually large may be an indicator of a malfunction of patient support apparatus 20 significant enough to warrant investigation by a technician or other qualified personnel.

In the embodiment illustrated in FIGS. 4-6, position switches 78a and 78b are spaced from their neighboring power switches 96a and 96b, respectively, a distance that is approximately equal to one quarter to one fifth of the entire distance between power switches 96a and 96. Other locations can, of course, be used. In at least one embodiment, controller 104 is programmed to stop motor 82 prior to tab 76 ever triggering either of power switches 96a or 96b. In such an embodiment, power switches 96a and 96b are never triggered except in the atypical case where the software control of motors 82 by controller 104 fails for some reason. Such programming of controller 104 eliminates the disadvantages that may arise when either of power switches 96a or 96b is triggered. Such disadvantages include the generation of back EMF (electromotive force) and/or EMI (electromagnetic interference) resulting from the instantaneous stopping of motor 82 by power switches 96a or 96b. This EMF and/or noise can cause error in the encoder signals, as well as potentially damaging electrical components contained within the drive circuitry used to drive motor 82. Still further, the instantaneous stopping of motor 82 via power switches 96a and 96b can create more stress on the actuator 34 and its internal components. By programming controller 104 to gradually stop motor 82 prior to extendable arm 70 reaching either of the power switches 96a or 96b, these potential disadvantages are avoided.

In some embodiments, controller 104 takes into account the speed and direction of motor 82 when controller 104 updates its running position estimate after one of position switches 78a and 78b have been triggered by tab 76. The speed and direction measurements, which are obtained from encoder signals 80, are used by controller 104 to provide an accurate updating of the running estimate of the extendable arm 70's absolute position. More specifically, the speed and direction measurements are used to account for the amount of time it takes for processor 104 for detect the triggering of one of position switches 78a and 78b, as well as the amount of time it takes processor 104 to react to the triggering and determine the updated the running position estimate. These amounts of time are determined empirically during the manufacture of patient support apparatus 20, and/or calculated or estimated during the design of patient support apparatus 20. However determined, the times are used by controller 104 to provide more accurate updating of the running estimate of position by taking into account the amount movement of extendable arm 70 that occurs in the interim time period between triggering position switch 78a or 78b and the actual updating of the position estimate by controller 104.

For example, suppose it takes controller 104 two tenths of a second from the time a position switch 78a or 78b is triggered until it updates its running position estimate of extendable arm 70. By knowing the speed and direction of extendable arm 70 at the moment it triggers either of position switches 78a or 78b, controller 104 is able to calculate how many additional pulses should be added to or subtracted from the position corresponding to the triggered switch 78. Continuing with the example where position switch 78a is positioned at the 5000 pulse count location, and supposing that extendable arm 70 is retracting at a speed of 200 pulses per second when it triggers position switch 78a, controller 104 calculates that in the two tenths of a second it takes itself to update the running position estimate, extendable arm 70 has retracted an additional distance of 40 pulses (0.2 seconds*200 pulses/second). Controller 104 therefore updates the position of extendable arm 70 by setting it equal to 4960 (5000–40), rather than 5000. To the extent extendable arm 70 is moving at a different speed, or in the opposite direction, controller 104 adjusts the updating of the position estimate based upon the additional movement of extendable arm 70 during the delay it takes for processor 104 to generate the appropriate position update.

Although the actuators 34 have been described herein as including two position switches 78a and 78b, it will be understood by those skilled in the art that fewer or greater numbers of position switches 78 can be used with any of the actuators 34. For example, in at least one embodiment, only a single position switch 78 is used. Whenever tab 76 triggers this single position switch 78, controller 104 updates its estimate of the position of extendable arm 70 using the stored location for that single position switch 78, in the manner described above. In still other embodiments, three or more position switches 78 are used and controller 104 updates the position estimate of the extendable arm 70 any time any one of the three position switches is triggered.

In still other embodiments, one or both of the power switches 94a and 94b are omitted from the actuator. In such embodiments, controller 104 is programmed to stop extendable arm 104 via software control, rather than the hardware of switches 94a and 94b, when extendable arm 70 reaches the limits of its retraction or extension.

In the embodiment of control system 102 shown in FIG. 10, the control of motors 82 is carried out via an H-bridge 116 positioned outside of actuators 34. H-bridge 116 is controlled by controller 104. In at least one embodiment, H-bridge 116 is operated and controlled by controller 104 in the same manner as controller 70 controls and operates H-bridge 74 of commonly assigned U.S. patent application Ser. No. 14/838,693 filed Aug. 28, 2015 by inventors Daniel Brosnan et al. and entitled PERSON SUPPORT APPARATUS WITH ACTUATOR BRAKE CONTROL, the complete disclosure of which is hereby incorporated herein by reference. Other manners of controlling H-bridge 116 may, of course, be used. Still further, the control of motors 82 may be carried out via controller 104 using other circuits or techniques besides H-bridges.

In another alternative embodiment, motors 82 are implemented as DC brushless motors. In such an embodiment, the commutation signals fed to the DC brushless motors by controller 104 are used in place of, or in addition to, the signals from encoder 80 for maintaining a running estimate of the position of extendable arm 70. That is, controller 104 uses the commutation signals to maintain a running estimate of extendable arm 70. Whenever tab 76 triggers one of position switches 78a or 78b, controller 104 updates this running absolute position estimate.

As shown in FIG. 10, sense lines 112a and 112b feed a digital signal (high or low) to controller 104 that is indicative of the status of each of position switches 78a and 78b, respectively. As described above, when controller 104 senses that a position switch 78a or 78b has been triggered, it retrieves from memory 84 the absolute position of the triggered position switch 78 and uses that absolute position switch to update its estimate of the position of extendable arm 70. It will be understood by those skilled in the art that, in another modified embodiment, the position of each of the position switches 78 is stored in a memory contained with housing 60. In this modified embodiment, actuator 34 contains suitable electronics to output the position of the triggered switch 78a or 78b to controller 104 whenever one of the position switches 78a or 78b is triggered. This modified design relieves controller 104 of the task of retrieving from memory 84 the position corresponding to the triggered switch. Instead, controller 104 is told this position via a signal transmitted from the actuator 34. In some embodiments, the signal is forwarded to controller 104 as a digital signal, rather than an analog signal.

In still another modified embodiment, actuator 34 is modified to include sufficient electronics to locally maintain a running estimate of the position of extendable arm 70 and to output this position estimate to controller 104. In this other modified embodiment, controller 104 is relieved of the task of maintaining and updating position estimates for each of the actuators 34. Indeed, in this embodiment, it is not necessary to feed signals from encoders 80 to controller 104. Instead, the electronics contained locally within actuator 34 include a counter, or other electronic circuitry, that maintains a running estimate of extendable arm 70 and that updates the running estimate whenever a position switch 78 is triggered. In this modified embodiment, the running position estimate contained locally within the actuator 34 can be stored in a memory local to actuator 34 and provided to controller 104 without the need for controller 104 to store this information. By determining and storing the position of extendable arm 70 locally within actuator 70, controller 104 can be rebooted, shut off, or otherwise interrupted and still be provided with an accurate indication of the absolute position of extendable arm 70 that takes into account any movement of actuators 34 that may have occurred during the time when controller 104 was rebooted, shut off, or otherwise interrupted in processing the signals from actuator 34.

Figure 11:
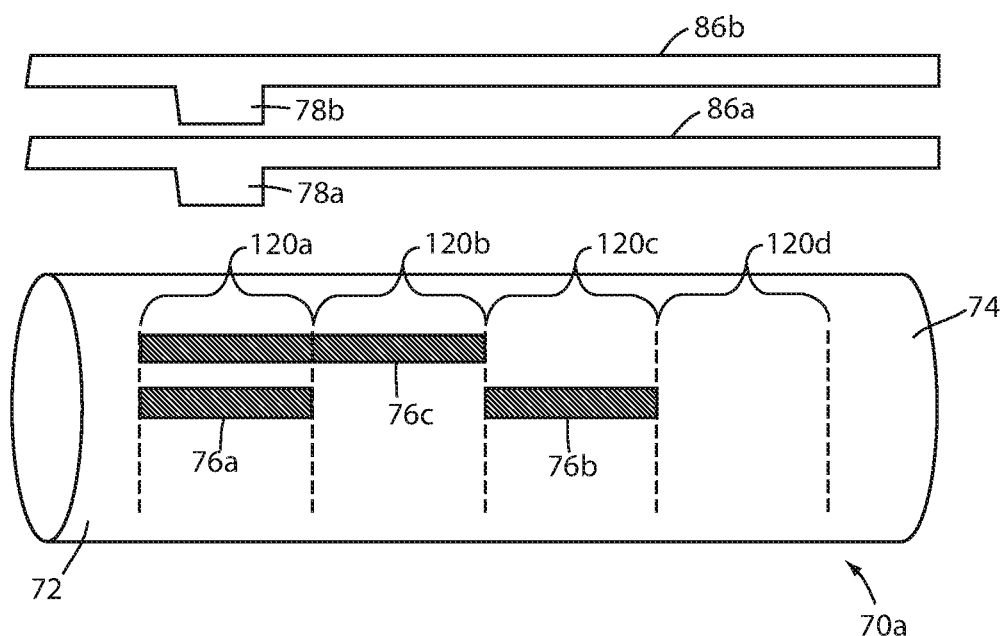
FIG. 11 is a side elevation view of a modified extendable arm that may be incorporated into any of the actuators disclosed herein.

FIG. 11 illustrates an alternative embodiment of an extendable arm 70a that may be used with any of the actuators 34 in lieu of extendable arm 70. Extendable arm 70a, like extendable arm 70, includes an attachment end 72 and an internal end 74. Extendable arm 70a differs from extendable arm 70 in that it includes multiple tabs 76a, 76b, and 76c, and tabs 76a-c have a longer length than tab 76 previously discussed. As can be seen in FIG. 11, tabs 76a and 76b are linearly aligned with each other, while tab 76c is spaced apart from tabs 76a and 76b but oriented substantially parallel to a line connecting tabs 76a and 76b. When extendable arm 70a is used with an actuator 34, the actuator is modified to include an additional switch bar 86. Thus, the modified actuator includes a first switch bar 86a that is positioned so as to be selectively triggered by tabs 76a and 76b, and a second switch bar 86b that is positioned so as to be selectively triggered by tab 76c. In some embodiments, switch bars 86a and 86b could be modified to include multiple position switches 78 attached thereto.

The multiple tabs 76a-c provide controller 104 with a direct measurement of which of four zones 120a-d extendable arm 70a is currently positioned within. Controller 104 accomplishes this by examining which specific ones of switches 78 are currently triggered and which ones are currently not triggered. For example, suppose that first switch bar 86a (FIG. 11) includes a first position switch 78a that is triggered by either of tabs 76a or 76b (but not tab 76c), depending upon the position of extendable arm 70a. Further, suppose that second switch bar 86b includes a second position switch 78b that is triggered by tab 76c (but not either of tabs 76a or 76b), depending upon the position of extendable arm 70a. If controller 104 senses that both first and second position switches 78a and 78b are triggered, then extendable arm 70a is currently located at a position in which position switches 78a and 78b are aligned with first zone 120a. If controller 104 senses that first position switch 78a is not triggered but second position switch 78b is triggered, then extendable arm 70a is currently located at a position in which position switches 78a and 78b are aligned with second zone 120b. If controller 104 sense that first position switch 78a is triggered, but second switch 78b is not triggered, then extendable arm 70a is currently located at a position in which position switches 78a and 78b are aligned with third zone 120c. Finally, if controller 104 senses that neither first nor second position switches 78a or 78b are triggered, then extendable arm 70a is currently located at a position in which position switches 78a and 78b are aligned with fourth zone 120d.

When an actuator having modified extendable arm 70a is used, controller 104 determines not only which of the four zones extendable arm 70 is currently located within, but also updates its running position estimate whenever one of position switches 78a and 78b transition from an open to a closed state, or from a closed to an open state. These transitions provide controller 104 with an exact absolute position, rather than a range of positions. Controller 104 uses these exact absolute position updates to update its running estimate of the position of extendable arm 70 in the manners described above.

It will be understood by those skilled in the art that greater numbers of zones can be used with extendable arm 70a, either by including more than one position switch 78 on each of the switch bars 86, and/or by including one or more additional rows of tabs 76. In this manner, a larger number of ranges are defined that each have a smaller extent, thereby enabling controller 104 to more finely determine the range of positions in which extendable arm 70a is currently located.

In still another alternative embodiment, position switches 78 contained within actuator 34 are omitted and replaced with one or more position switches that are triggered by movable components of patient support apparatus 20. Such component switches are placed on patient support apparatus at any suitable location where they will be triggered by the movement of seat 22, backrest 24, and/or leg rest 26. The position of the seat 22, backrest 24, and/or leg rest 26 when it triggers the component switch is stored in memory 84 and used by controller 104 to update the running estimate of the absolute position estimate of extendable arm 70 in the manners described above.

Various additional alterations and changes beyond those already mentioned herein can be made to the above-described embodiments. This disclosure is presented for illustrative purposes and should not be interpreted as an exhaustive description of all embodiments or to limit the scope of the claims to the specific elements illustrated or described in connection with these embodiments. For example, and without limitation, any individual element(s) of the described embodiments may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Any reference to claim elements in the singular, for example, using the articles "a," "an," "the" or "said," is not to be construed as limiting the element to the singular.

What is claimed is:

1. A patient support apparatus comprising:
   a frame;
   a support surface adapted to support a person thereon;
   a movable component supported by the frame;
   an actuator having an extendable arm adapted to move the movable component, the actuator including a housing having the following components positioned inside of the housing: a brushless DC motor, a motor controller adapted to supply a commutation signal to the brushless DC motor, a spindle powered by the brushless DC motor and adapted to move the extendable arm, and a position switch; and
   a controller positioned outside of the housing, the controller adapted to estimate an absolute position of the extendable arm based upon commutation signals supplied to the brushless DC motor by the controller, to update the absolute position estimate when the extendable arm triggers the position switch, to determine a difference between the absolute position estimate before the extendable arm triggers the position switch and the absolute position estimate after the extendable arm triggers the position switch, and to issue an alert if the difference exceeds a threshold.

2. The patient support apparatus of claim 1 wherein the controller is adapted to update the absolute position estimate of the extendable arm by reading from memory a value associated with a position of the position switch, the value being stored in memory during a calibration process of the actuator.

3. The patient support apparatus of claim 1 further comprising a second position switch positioned inside of the housing and in communication with the controller, the controller further adapted to update the absolute position estimate when the extendable arm triggers the second position switch.

4. The patient support apparatus of claim 3 wherein the controller is adapted to update the absolute position estimate of the extendable arm by reading from memory a second value associated with a position of the second position switch.

5. The patient support apparatus of claim 1 wherein the movable component has a range of movement and the position switch is located at a position inside of the housing corresponding to a high use portion of the range of movement.

6. The patient support apparatus of claim 1 further comprising a component switch positioned outside of the housing, the component switch adapted to be triggered when the movable component is in a particular position, wherein the component switch is in communication with the controller and the controller is adapted to update the absolute position estimate of the extendable arm when the movable component triggers the component switch.

7. The patient support apparatus of claim 1 wherein the controller includes an H-bridge for controlling a speed and a direction of the brushless DC motor.

8. The patient support apparatus of claim 1 further comprising a first power switch and a second power switch, wherein the first and second power switches are adapted to cut power to the brushless DC motor, without intervention by the controller, when the extendable arm triggers the first and second power switches.

9. The patient support apparatus of claim 8 wherein the cutting of power to the brushless DC motor by either of the power switches does not cut power to the position switch or to the controller.

10. The patient support apparatus of claim 8 wherein the controller determines both a speed and direction of the brushless DC motor based on the commutation signals and uses both the speed and direction determinations when updating the absolute position estimate of the extendable arm.

11. The patient support apparatus of claim 8 wherein the controller is further adapted to stop the brushless DC motor prior to the extendable arm triggering either of the power switches.

12. The patient support apparatus of claim 1 wherein the patient support apparatus is a chair, the support surface includes a seat, the movable component is a backrest of the chair, and the actuator is adapted to change an orientation of the backrest relative to the seat.

13. A patient support apparatus comprising:
a frame;
a support surface adapted to support a person thereon;
a movable component supported by the frame;
an actuator having an extendable arm adapted to move the movable component, the actuator including a housing having the following components positioned inside of the housing: a motor, and a spindle powered by the motor and adapted to move the extendable arm;
a first position switch adapted to be open in a first range of positions of the extendable arm and closed in a second range of positions of the extendable arm;
a second position switch adapted to be open in a third range and a fourth range of positions of the extendable arm, the third range being a subset of the first range and the fourth range being a subset of the second range; and
a controller in communication with the first and second position switches and adapted to determine in which of the first through fourth ranges the extendable arm is located.

14. The patient support apparatus of claim 13 wherein the first and second position switches are positioned inside of the actuator housing and are triggered by different portions of the extendable arm.

15. The patient support apparatus of claim 14 wherein the controller is further adapted to determine a discrete position of the extendable arm within one of the first through fourth ranges whenever at least one of the first and second position switches changes states.

16. The patient support apparatus of claim 13 wherein the patient support apparatus is a chair, the support surface includes a seat, the movable component is a backrest of the chair, and the actuator is adapted to change an orientation of the backrest relative to the seat.

* * * * *